United States Patent
Landers et al.

(10) Patent No.: US 10,064,390 B1
(45) Date of Patent: Sep. 4, 2018

(54) WIRELESS LOCATION ASSISTED ZONE GUIDANCE SYSTEM INCORPORATING A MULTI-ZONE CONTAINMENT AREA

(71) Applicants: Rodney P. Landers, Woodbury, MN (US); Kevin L. Nieuwsma, Lakeville, MN (US); Chad R. James, Redmond, OR (US); Michael D. Erickson, Minneapolis, MN (US); Gregory M. Anderson, Bloomington, MN (US)

(72) Inventors: Rodney P. Landers, Woodbury, MN (US); Kevin L. Nieuwsma, Lakeville, MN (US); Chad R. James, Redmond, OR (US); Michael D. Erickson, Minneapolis, MN (US); Gregory M. Anderson, Bloomington, MN (US)

(73) Assignee: GPSIP, Inc., Oshkosh, WI (US)

( * ) Notice: Subject to any disclaimer, the term of this patent is extended or adjusted under 35 U.S.C. 154(b) by 410 days.

(21) Appl. No.: 14/660,926

(22) Filed: Mar. 17, 2015

Related U.S. Application Data

(63) Continuation-in-part of application No. 14/217,390, filed on Mar. 17, 2014, now abandoned.
(Continued)

(51) Int. Cl.
*A01K 15/04* (2006.01)
*A01K 15/02* (2006.01)
(Continued)

(52) U.S. Cl.
CPC .......... *A01K 15/023* (2013.01); *A01K 15/021* (2013.01); *A01K 27/009* (2013.01); *A01K 29/005* (2013.01); *H04W 4/02* (2013.01)

(58) Field of Classification Search
CPC .... A01K 15/02; A01K 15/021; A01K 15/023; A01K 15/029; A01K 15/04
See application file for complete search history.

(56) References Cited

U.S. PATENT DOCUMENTS

| | | |
|---|---|---|
| 4,393,448 A | 7/1983 | Dunn et al. |
| 4,590,569 A | 5/1986 | Rogoff et al. |

(Continued)

FOREIGN PATENT DOCUMENTS

| | | |
|---|---|---|
| WO | WO 94/27268 A1 | 11/1994 |
| WO | WO 2015/021116 A1 | 9/2015 |

OTHER PUBLICATIONS

"Boundary Plus Computer Collar Unit Owner's Manual", Invisible Fence, 10 pages.
(Continued)

*Primary Examiner* — Thanh T Pham
(74) *Attorney, Agent, or Firm* — Albert W. Watkins

(57) ABSTRACT

Individual zones are defined within a multi-zone assisted guidance region by storing a zone GPS data point target width, assigning GPS data points located within a perimeter and within the target width to a second zone, allotting GPS data points located interior of and distinct from the second zone and within the target width to a first zone; and finally ascribing unassigned GPS data points located interior of and distinct from the first zone to a safe zone. If there is not enough total width between perimeter points in a region to provide all zones at the target width, a data point width of more exterior zones are preferentially electronically maintained at the target width and more interior zones are reduced or eliminated. In addition, adjacent guidance zones have unique stimulation that acts through different neurological access channels to provide behavioral guidance to an animal.

11 Claims, 6 Drawing Sheets

Related U.S. Application Data

(60) Provisional application No. 61/954,584, filed on Mar. 17, 2014, provisional application No. 61/801,509, filed on Mar. 15, 2013.

(51) Int. Cl.
  *A01K 29/00* (2006.01)
  *A01K 27/00* (2006.01)
  *H04W 4/02* (2018.01)

(56) References Cited

U.S. PATENT DOCUMENTS

| | | | |
|---|---|---|---|
| 4,611,209 A | 9/1986 | Lemelson et al. |
| 4,817,000 A | 3/1989 | Eberhardt |
| 4,967,696 A | 11/1990 | Tobias |
| 4,999,782 A | 3/1991 | BeVan |
| 5,067,441 A | 11/1991 | Weinstein |
| 5,191,341 A | 3/1993 | Gouard et al. |
| 5,351,653 A | 10/1994 | Marischen et al. |
| 5,353,744 A | 10/1994 | Custer |
| 5,355,511 A | 10/1994 | Hatano et al. |
| 5,381,129 A | 1/1995 | Boardman |
| 5,389,934 A | 2/1995 | Kass |
| 5,408,956 A | 4/1995 | Quigley |
| 5,450,329 A | 9/1995 | Tanner |
| 5,491,486 A | 2/1996 | Welles, II et al. |
| 5,568,119 A | 10/1996 | Schipper et al. |
| 5,587,904 A | 12/1996 | Ben-Yair et al. |
| 5,594,425 A | 1/1997 | Ladner et al. |
| 5,751,612 A | 5/1998 | Donovan et al. |
| 5,791,294 A | 8/1998 | Manning |
| 5,857,433 A | 1/1999 | Files |
| 5,868,100 A | 2/1999 | Marsh |
| 5,911,199 A | 6/1999 | Farkas et al. |
| 5,949,350 A | 9/1999 | Girard et al. |
| 6,043,748 A | 3/2000 | Touchton et al. |
| 6,079,367 A | 6/2000 | Stapelfeld et al. |
| 6,114,957 A | 9/2000 | Westrick et al. |
| 6,172,640 B1 | 1/2001 | Durst et al. |
| 6,232,880 B1 | 5/2001 | Anderson et al. |
| 6,232,916 B1 | 5/2001 | Grillo et al. |
| 6,236,358 B1 | 5/2001 | Durst et al. |
| 6,263,836 B1 | 7/2001 | Hollis |
| 6,271,757 B1 | 8/2001 | Touchton et al. |
| 6,313,791 B1 | 11/2001 | Klanke |
| 6,421,001 B1 | 7/2002 | Durst et al. |
| 6,441,778 B1 | 8/2002 | Durst et al. |
| 6,480,147 B2 | 11/2002 | Durst et al. |
| 6,487,992 B1 | 12/2002 | Hollis |
| 6,518,919 B1 | 2/2003 | Durst et al. |
| 6,561,137 B2 | 5/2003 | Oakman |
| 6,581,546 B1 | 6/2003 | Dalland et al. |
| 6,700,492 B2 | 3/2004 | Touchton et al. |
| 6,748,902 B1 | 6/2004 | Boesch et al. |
| 6,903,682 B1 | 6/2005 | Maddox |
| 6,923,146 B2 | 8/2005 | Kobitz et al. |
| 7,034,695 B2 | 4/2006 | Troxler |
| 7,259,718 B2 | 8/2007 | Patterson et al. |
| 7,328,671 B2 | 2/2008 | Kates |
| 7,677,204 B1 | 3/2010 | James |
| 7,764,228 B2 | 7/2010 | Durst et al. |
| 7,856,947 B2 | 12/2010 | Giunta |
| 8,065,074 B1 | 11/2011 | Liccardo |
| 8,115,642 B2 | 2/2012 | Thompson et al. |
| 8,115,942 B2 | 2/2012 | Thompson et al. |
| 8,155,871 B2 | 4/2012 | Lohi et al. |
| 8,624,723 B2 | 1/2014 | Troxler |
| 8,757,098 B2 | 6/2014 | So et al. |
| 8,797,141 B2 | 8/2014 | Best et al. |
| 8,839,744 B1 | 9/2014 | Bianchi et al. |
| 8,851,019 B2 | 10/2014 | Jesurum |
| 8,957,812 B1 | 2/2015 | Hill et al. |
| 2006/0061469 A1 | 3/2006 | Jaeger et al. |
| 2006/0197672 A1 | 9/2006 | Talamas, Jr. et al. |
| 2007/0204804 A1 | 9/2007 | Swanson et al. |
| 2008/0036610 A1 | 2/2008 | Hokuf et al. |
| 2008/0252527 A1 | 10/2008 | Garcia |
| 2009/0102668 A1 | 4/2009 | Thompson et al. |
| 2009/0267832 A1 | 10/2009 | Hymel |
| 2009/0292426 A1* | 11/2009 | Nelson ............ A01B 79/005 701/50 |
| 2010/0139576 A1 | 6/2010 | Kim et al. |
| 2011/0163873 A1* | 7/2011 | McIntosh ............ G01S 19/14 340/539.13 |
| 2011/0172916 A1 | 7/2011 | Pakzad et al. |
| 2011/0193706 A1 | 8/2011 | Dickerson |
| 2012/0000431 A1 | 1/2012 | Khoshkish |
| 2013/0127658 A1 | 5/2013 | McFarland et al. |
| 2013/0157628 A1* | 6/2013 | Kim ............ A01K 15/023 455/414.1 |
| 2014/0230755 A1 | 8/2014 | Trenkle et al. |
| 2015/0016730 A1* | 1/2015 | Miller ............ G06K 9/0063 382/195 |
| 2015/0020750 A1 | 1/2015 | Jesurum |
| 2015/0107531 A1* | 4/2015 | Golden ............ A01K 11/008 119/719 |
| 2015/0216142 A1 | 8/2015 | Landers et al. |

OTHER PUBLICATIONS

"Global Pet Finder GPS Pet Tracker", http://www.amazon.com/Global-Pet-Finder-GPS-Tracker/, Nov. 19, 2013, 5 pages.

"Tagg—The Pet Tracker Master Kit, White by Snaptracs, Inc.", http://www.amazon.com/TAGG-The-Pet-Tracker-Guard/, Nov. 19, 2013, 5 pages.

"Boundary Plus", http://www.invisiblefence.com/find-the-right-solution/, Jan. 29, 2013, 3 pages.

"Lookup_table", http://www.Wikipedia.org/wiki/Lookup_table, Feb. 15, 2013, 10 pages.

"SkyFence: Our_Product", http://www.gpspetfence.homestead.com/resources.html, Jan. 29, 2013, 3 pages.

"SkyFence: Purchase", http://www.gpspetfence.homestead.com/Purchase.html, Jan. 29, 2013, 2 pages.

"Tagg: About Us", http://www.pettracker.com/about-tagg, Jan. 29, 2013, 1 page.

"Kalman Filter", Wikipedia, https://en.wikipedia.org/wiki/Kalman_filter, Jan. 18, 2016, 37 pages.

Skinner, B. F., "Superstition in the Pigeon", Journal of Experimental Psychology, vol. 38, pp. 168-172, 1948.

* cited by examiner

FIG. 5

WIRELESS LOCATION ASSISTED ZONE GUIDANCE SYSTEM INCORPORATING A MULTI-ZONE CONTAINMENT AREA

CROSS REFERENCE TO RELATED APPLICATIONS

This application claims the benefit under 35 U.S.C. 119(e) of U.S. provisional 61/954,584, filed Mar. 17, 2014, and is also a continuation-in-part of U.S. patent application Ser. No. 14/217,390, filed Mar. 17, 2014, which in turn claims the benefit under 35 U.S.C. 119(e) of U.S. provisional 61/801,509, filed Mar. 15, 2013, the contents of each which are incorporated herein by reference in entirety.

BACKGROUND OF THE INVENTION

1. Field of the Invention

This invention pertains generally to electrical communications, and more particularly to condition responsive indicating systems with a radio link and including personal portable device for tracking location. The condition responsive indicating systems of the present invention monitor the specific condition of humans or animals. In one preferred manifestation, a fully self-contained collar designed in accord with the teachings of the present invention monitors the location of a pet such as a dog, and provides a plurality of zones within which well defined and positive stimulus are provided to train the pet to stay within a predetermined area.

2. Description of the Related Art

Dogs are well known as "man's best friend" owing to the many beneficial services that they provide. However, and likely since mankind first befriended dogs, there has existed a need to control the territory that a dog has access to. There are many reasons that motivate this need, many which may be relatively unique to a particular dog or owner, and other reasons that are far more universal.

Irrespective of the reason, there have been limited ways to communicate to a dog a territory that the dog should stay within, and to elicit this behavior from a dog. One method is a fixed containment structure such as a fence or building. A structure of this nature provides a physical boundary or barrier which blocks passage of an animal such as a pet or farm animal. As may be apparent, such structures are typically expensive and time consuming to install, and necessarily static in location. In other words, they are only useful at the location where they are constructed, and so are of no value when a pet and owner travel. Furthermore, these static structures often interfere in other ways with other activities of the dog owner, such as with lawn care or interfering with the owner's movement about a property. In addition, a dog may find ways to bypass the structure, such as by digging under a fence or slipping through a not-quite completely secured gate.

A second approach to controlling accessible territory is through a combination collar and leash or similar restraint. The leash is anchored to a fixed point, or in the best of situations, to a line or cable along which the dog can travel. Unfortunately, most dogs are notoriously bad at untangling or unwrapping a leash from a fixed object. Consequently, dogs tend to tangle the leash about trees, posts and other objects, and can become completely unable to move. If the owner is not aware that the dog has become tangled, this can lead to dangerous situations in cases such as extreme weather or when the dog has been left unattended for an extended period.

Additionally, some dogs are very good at escaping the leash, such as by backing away from the leash and using the leash force to slip off the collar, or by chewing through the leash. Once again, if the owner is unaware, the dog may travel from the desired area into other unsuitable areas such as roadways and the like. This may put both dog and humans in jeopardy, such as when a vehicle swerves to avoid the dog or when a dog has a temperament not suited to the general human population.

The leash also necessarily defines the region in which the dog may travel. For exemplary purposes, with a ground stake and a leash the dog is constrained to a circle. In this example, the owner will typically define the circle to the smallest radius that the dog may desirably travel within. As can be understood, for all but circularly shaped areas, this leads to a great deal of space that the dog cannot access, but which would otherwise be suitable for the dog.

In consideration of the limitations of static structures and leashes, various artisans have proposed other systems that provide more flexibility and capability, such as buried or above ground transmitter antennas and radio collars that either detect the crossing of a buried line or detect the reception or absence of reception of a signal broadcast by the transmitter antenna. When an undesirable location is detected, the radio collar is then triggered, typically to provide a painful electrical stimulation to the dog. Desirably, the electrical stimulation is mild enough not to harm the dog, but yet still strong enough to cause the dog to want to avoid additional similar stimulation. These systems remove the physical link between a dog and a static structure, meaning the dog will not get tangled in obstacles when moving about. Further, in the case of a buried line, the line may follow any geometry of land, and so is not limited to a circular pattern limited by a particular radius.

Unfortunately, burying a line can be difficult or impossible if there are other objects, such as irrigation systems, buried utility lines, landscaping, hard surfaces, trees, or other fixed objects. Additionally, current soil conditions such as frozen soil or snow-covered ground in the winter may also limit the ability to bury the line. Furthermore, the effort required to bury the line limits these systems to a single location, meaning the system cannot readily be moved or transposed from the home to a popular park or the like.

Radio systems that rely upon the detection of a signal to generate a shock, such as the buried line, are also well known to be significantly affected by static and other forms of Electro-Magnetic Interference or Radio-Frequency Interference (EMI-RFI). Consequently, a dog may be shocked or otherwise punished without basis or appropriate reason. This problem is also very location dependent, meaning that there are places where there is so much EMI-RFI that a radio system is completely unusable. As a result of the inability to completely eliminate or substantially eradicate the effects of EMI-RFI, the use of these radio systems is far from universal.

When the shock is instead triggered by the absence of a radio signal, such as when a beacon is used to contain a pet, obstacles such as buildings may prevent reception, undesirably limiting the range of travel of the animal. Furthermore, blocking the signal from the collar, such as when a dog lays down, is being caressed by the owner, or is oriented in the wrong direction, may also lead to radio signal attenuation and undesirable triggering of the shock.

As is known in the field of psychology, this random punishment that is commonplace in both types of radio systems can literally destroy the training of a dog, and may lead to erratic or wanton misbehavior. Instead, many dog owners continue to rely upon static structures or leashes to control the territory accessible by their dog.

Another problem arises when a dog unintentionally crosses a buried line. Since it is the crossing of the line that leads to the stimulation, even when the dog realizes and tries to return, the same stimulation originally keeping the dog in a containment area is now being used to keep the dog out of that containment area. Consequently, the dog will be extremely confused, and will commonly not return, even where the dog would have otherwise. As but one exemplary purpose, when a rabbit, squirrel, or other animate creature is being chased by the dog, the dog will typically be so intent on the pursuit as to completely lose track of the location of the buried line. The dog's speed may be so great that even the stimulation is very short as the dog crosses the buried line, in the heat of the chase. Furthermore, the dog's attention and focus are thoroughly directed at the pursuit of the animate creature, and even the most powerful stimulus may go unnoticed. However, once the chase is over, the dog's adrenaline or drive has diminished. A reasonably well-behaved dog will then most likely be moving more slowly back toward "home" within the containment area. Unfortunately then, the stimulation trying to re-enter will most frequently be of much longer duration, and much more recognized by the now not-distracted dog, than when the dog left the containment area. As can be appreciated, this is backwards of the intent of a training system.

With the advent and substantial advancement of Global Positioning Systems (GPS), presently primarily used for navigation, artisans have recognized the opportunity to incorporate GPS technology into pet containment. Several systems have been proposed in the literature for several decades, but these systems have not as yet become commercially viable.

One significant limitation of prior art GPS systems is the accuracy of the system. Accuracy can be dependent upon variables such as atmospheric variations, signal reflections and signal loss due to obstacles, and variability intentionally introduced into the system. Similar variability is found in various radio and cellular locating systems.

A GPS or similar navigation system that is accurate to plus or minus ten meters is very adequate for navigational purposes, for example to guide a person to a commercial building for a meeting or for other commerce. However, for pet containment this level of accuracy is completely unacceptable. For exemplary purposes, many residential yards are forty feet wide, or approximately 10 meters. A system that is only accurate to plus or minus ten meters might try to locate the dog in either neighbor's yard on any given day or at any given moment, depending upon unpredictable and uncontrollable variables such as atmospheric conditions. As will be readily appreciated, this unpredictable locating will lead to punishment of the animal when, in fact, the animal is within the proper location. In turn, this will lead to a complete failure of training, and erratic and unpredictable behavior of the animal.

Another limitation is the amount of calculation required to determine whether the pet is within a selected area of containment. Most prior art GPS systems use nodes to define the perimeter, and then mathematically calculate where the pet is relative to the nodes. Unfortunately, this requires a substantial amount of computation, which increases greatly as the number of nodes are increased. As a result, these systems commonly rely upon a primary processing system that is remote from the dog, to which the dog's collar is coupled via radio waves or the like. This permits the primary processing system to perform calculations and then relay results or control signals back to the collar. Undesirably, this also adds complexity, drains precious battery power limiting the usable collar time, and again makes the containment system dependent upon conventional radio communications systems. In addition, the need for both the collar and a secondary base station makes the system far less portable. This means, for example, that taking the dog away from home to a park may be impractical.

A further limitation of the prior art is battery life. A collar that must be removed and recharged every few hours is unacceptable for most purposes. Unfortunately, the intensive computations required by prior art systems require either a fast and consequently higher power processor unit, or a communications link such as a radio link to a base station. While the collar unit may transmit data back to the base unit to avoid the need for complex computational ability, even the transmission of position information and reception of collar actions requires a reasonably powered radio. It will be apparent that walkie-talkies, cell phones and other hand-held radio devices all have very large batteries to provide adequate transmission and reception life, and yet these devices often only support several hours of communications. As can be appreciated, size and weight are severely restricted for a device fully self-contained on a dog's collar, and the inclusion of a large battery is undesirable.

Yet another limitation of the prior art is the unintentional blocking or loss of GPS signals. There are a number of conditions that can lead to loss of GPS signals. One is unfavorable weather, which can lead to a severely attenuated satellite signal, and much higher Signal to Noise Ratios (SNR). Another condition is an adjacent building, canyon wall, or other obstacle that blocks satellite signals. Such a signal might, for exemplary purposes, either block all signals such as commonly occurs within a building, or instead may only block signals from one direction. However, GPS systems require multiple satellites to obtain a position fix, and even if only one of the satellites is blocked, then the ability to accurately fix position may be lost. Another situation that can lead to signal loss is when the collar itself is covered. This can, for exemplary and non-limiting purposes, occur when a dog lays down. If the dog lays in an unfortunate position partially or completely covering the collar, then satellite signals will be either blocked or too severely attenuated.

In any of these situations where the GPS signal is partially or completely blocked or attenuated, the latitudinal and longitudinal positional accuracy will either be inadequate, or may be completely lost. In such instances, a prior art collar may become completely non-functional. Worse, this loss of function can occur without notice in an erratic manner, possibly causing severe harm to the training of the dog.

In addition to the aforementioned limitations, prior art electronic fences have also attempted to train the animal using punishment, such as a shock, to elicit the desired behavior. As is very well known and established, negative reinforcement is less effective than positive reinforcement or a combination of positive and negative reinforcement. Furthermore, the type of reinforcement can also affect the temperament of the animal. This need for aversive treatment is, at least in part, believed to be due to the equally harsh construction of a boundary. The prior art structural fence evolved into an electronic fence that provided a harsh and distinct border which the animal was never supposed to cross. However, the natural instincts of many animals are to wander and explore. This harsh border provides little or no warning to an exploring animal, and, as noted herein above, this border may even move with respect to a fixed land location. The combination can literally destroy the psychological well-being of the animal. Consequently, it is desirable to not only provide consistent behavioral reinforcement, but also to provide that reinforcement in a positive manner.

The following patents and published patent applications are believed to be exemplary of the most relevant prior art, and the teachings and contents of each are incorporated herein by reference: U.S. Pat. No. 4,393,448 by Dunn et al, entitled "Navigational plotting system"; U.S. Pat. No. 4,590,569 by Rogoff et al, entitled "Navigation system including an integrated electronic chart display"; U.S. Pat. No. 4,611,209 by Lemelson et al, entitled "Navigation warning system and method"; U.S. Pat. No. 4,817,000 by Eberhardt, entitled "Automatic guided vehicle system"; U.S. Pat. No. 4,999,782 by BeVan, entitled "Fixed curved path waypoint transition for aircraft"; U.S. Pat. No. 5,067,441 by Weinstein, entitled "Electronic assembly for restricting animals to defined areas"; U.S. Pat. No. 5,191,341 by Gouard et al, entitled "System for sea navigation or traffic control/assistance"; U.S. Pat. No. 5,351,653 by Marischen et al, entitled "Animal training method using positive and negative audio stimuli"; U.S. Pat. No. 5,353,744 by Custer, entitled "Animal control apparatus"; U.S. Pat. No. 5,355,511 by Hatano et al, entitled "Position monitoring for communicable and uncommunicable mobile stations"; U.S. Pat. No. 5,381,129 by Boardman, entitled "Wireless pet containment system"; U.S. Pat. No. 5,389,934 by Kass, entitled "Portable locating system"; U.S. Pat. No. 5,408,956 by Quigley, entitled "Method and apparatus for controlling animals with electronic fencing"; U.S. Pat. No. 5,450,329 by Tanner, entitled "Vehicle location method and system"; U.S. Pat. No. 5,568,119 by Schipper et al, entitled "Arrestee monitoring with variable site boundaries"; U.S. Pat. No. 5,587,904 by Ben-Yair et al, entitled "Air combat monitoring system and methods and apparatus useful therefor"; U.S. Pat. No. 5,594,425 by Ladner et al, entitled "Locator device"; U.S. Pat. No. 5,751,612 by Donovan et al, entitled "System and method for accurate and efficient geodetic database retrieval"; U.S. Pat. No. 5,791,294 by Manning, entitled "Position and physiological data monitoring and control system for animal herding"; U.S. Pat. No. 5,857,433 by Files, entitled "Animal training and tracking device having global positioning satellite unit"; U.S. Pat. No. 5,868,100 by Marsh, entitled "Fenceless animal control system using GPS location information"; U.S. Pat. No. 5,911,199 by Farkas et al, entitled "Pressure sensitive animal training device"; U.S. Pat. No. 5,949,350 by Girard et al, entitled "Location method and apparatus"; U.S. Pat. No. 6,043,748 by Touchton et al, entitled "Satellite relay collar and programmable electronic boundary system for the containment of animals"; U.S. Pat. No. 6,114,957 by Westrick et al, entitled "Pet locator system"; U.S. Pat. No. 6,172,640 by Durst et al, entitled "Pet locator"; U.S. Pat. No. 6,232,880 by Anderson et al, entitled "Animal control system using global positioning and instrumental animal conditioning"; U.S. Pat. No. 6,232,916 by Grillo et al, entitled "GPS restraint system and method for confining a subject within a defined area"; U.S. Pat. No. 6,236,358 by Durst et al, entitled "Mobile object locator"; U.S. Pat. No. 6,263,836 by Hollis, entitled "Dog behavior monitoring and training apparatus"; U.S. Pat. No. 6,271,757 by Touchton et al, entitled "Satellite animal containment system with programmable Boundaries"; U.S. Pat. No. 6,313,791 by Klanke, entitled "Automotive GPS control system"; U.S. Pat. No. 6,421,001 by Durst et al, entitled "Object locator"; U.S. Pat. No. 6,441,778 by Durst et al, entitled "Pet locator"; U.S. Pat. No. 6,480,147 by Durst et al, entitled "Portable position determining device"; U.S. Pat. No. 6,487,992 by Hollis, entitled "Dog behavior monitoring and training apparatus"; U.S. Pat. No. 6,518,919 by Durst et al, entitled "Mobile object locator"; U.S. Pat. No. 6,561,137 by Oakman, entitled "Portable electronic multi-sensory animal containment and tracking device"; U.S. Pat. No. 6,581,546 by Dalland et al, entitled "Animal containment system having a dynamically changing perimeter"; U.S. Pat. No. 6,700,492 by Touchton et al, entitled "Satellite animal containment system with programmable boundaries"; U.S. Pat. No. 6,748,902 by Boesch et al, entitled "System and method for training of animals"; U.S. Pat. No. 6,903,682 by Maddox, entitled "DGPS animal containment system"; U.S. Pat. No. 6,923,146 by Kobitz et al, entitled "Method and apparatus for training and for constraining a subject to a specific area"; U.S. Pat. No. 7,034,695 by Troxler, entitled "Large area position/proximity correction device with alarms using (D)GPS technology"; U.S. Pat. No. 7,259,718 by Patterson et al, entitled "Apparatus and method for keeping pets in a defined boundary having exclusion areas"; U.S. Pat. No. 7,328,671 by Kates, entitled "System and method for computer-controlled animal toy"; U.S. Pat. No. 7,677,204 by James, entitled "Dog training device"; U.S. Pat. No. 8,155,871 by Lohi et al, entitled "Method, device, device arrangement and computer program for tracking a moving object"; U.S. Pat. No. 8,115,942 by Thompson et al, entitled "Traveling invisible electronic containment perimeter—method and apparatus"; U.S. Pat. No. 8,624,723 by Troxler, entitled "Position and proximity detection systems and methods"; U.S. Pat. No. 8,757,098 by So et al, entitled "Remote animal training system using voltage-to-frequency conversion"; U.S. Pat. No. 8,797,141 by Best et al, entitled "Reverse RFID location system"; U.S. Pat. No. 8,839,744 by Bianchi et al, entitled "Mobile telephone dog training tool and method"; U.S. Pat. No. 8,851,019 by Jesurum, entitled "Pet restraint system"; 2007/0204804 by Swanson et al, entitled "GPS pet containment system and method"; 2008/0252527 by Garcia, entitled "Method and apparatus for acquiring local position and overlaying information"; 2011/0193706 by Dickerson, entitled "Sensor collar system"; 2012/0000431 by Khoshkish, entitled "Electronic pet containment system"; 2013/0127658 by McFarland et al, entitled "Method and apparatus to determine actionable position and speed in GNSS applications"; and EP 0699330 and WO 94/27268 by Taylor, entitled "GPS Explorer".

In addition to the foregoing, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a wireless location assisted multi-zone guidance system. The system includes a housing and an electrical power source contained within the housing. At least one animal stimulation apparatus is electrically coupled with the housing and powered by the electrical power source. A wireless location determination apparatus is contained within the housing, powered by the electrical power source, and adapted to operatively generate electrical latitude and longitude information representative of a current position of the housing. An electrical processor is coupled to the wireless location determination apparatus and is operative to receive electrical latitude and longitude information therefrom. Memory is included that is electrically accessible by the processor. A data table is stored in the electrically accessible memory and uniquely locates a plurality of guidance zones defined using the latitude and longitude information, each one of the plurality of guidance zones having an associated unique set of characteristics used by the processor to provide behavioral guidance stimulation to the animal through the animal stimulation apparatus and including at least a safe zone, a first alert zone, and a second alert zone. The electrical processor is adapted to operatively compare received electrical latitude and longitude information to the data table to generate a first represented current position within the data table, to read a value from within the data table, and adapted to vary an output of the at least one animal stimulation apparatus responsive to the read value.

In a second manifestation, the invention is a method of defining individual zones within a multi-zone assisted guidance region having at least a perimeter, a safe zone interior of the perimeter, a second zone adjacent to the perimeter, and a first zone adjacent to the safe zone. In accord with the method, a zone GPS data point target width is electronically stored. GPS data points located within the perimeter are electronically calculated. GPS data points located within the perimeter and within a number of GPS points of the perimeter approximately equal to the zone GPS data point target width are electronically assigned to the second zone. GPS data points located interior of and distinct from the second zone and within a number of GPS points of the second zone approximately equal to the zone GPS data point target width are electronically allotted to the first zone. Unassigned GPS data points located interior of and distinct from said first zone are electronically ascribed to the safe zone. For each of the individual zones calculated, if there is not enough total width between perimeter points in a region of the assisted guidance region to provide all zones at the zone GPS data point target width, a data point width of more exterior zones are preferentially electronically maintained at the zone GPS data point target width, and more interior zones are reduced or eliminated.

In a third manifestation, the invention is a wireless location assisted multi-zone guidance system adapted to assist in the training and management of an animal. The system comprises a wireless location determination apparatus. At least one animal stimulation apparatus is operative to generate non-aversive stimulation including auditory stimulation, vibratory stimulation, and transcutaneous electrical nerve stimulation. A processor is coupled to the wireless location determination apparatus and operative to receive latitude and longitude information therefrom and coupled to the at least one animal stimulation apparatus and adapted to operatively control a generation of stimulation. Memory is coupled with and accessible by the processor. A data table is stored in the memory as a two-dimensional array having a first index adapted to operatively represent an ordinate and having a second index adapted to operatively represent an abscissa. A plurality of geographically defined guidance zones are operatively stored in the data table, a first one of the ordinate and abscissa corresponding to longitude and a second one of the ordinate and abscissa corresponding to latitude, respectively, with each value stored in the data table identifying a one of the plurality of geographically defined guidance zones. The processor is adapted to operatively receive latitude and longitude information from the wireless location determination apparatus, retrieve a value stored in a location in the data table using the longitude information as the first array index and latitude information as the second array index, and use the retrieved value to determine a one of the plurality of guidance zones that the latitude and longitude information from the wireless location determination apparatus is associated with, and provide behavioral guidance stimulation selected from said auditory stimulation, vibratory stimulation, and transcutaneous electrical nerve stimulation, the particular stimulation type selected responsive to said guidance zone determination.

OBJECTS OF THE INVENTION

Exemplary embodiments of the present invention solve inadequacies of the prior art by providing a lookup table. In a most preferred embodiment of the invention, the table is defined by rows and columns that are mapped to ordinate and abscissa data points representing predefined geographic locations. Each data point offset in the table corresponds to a predefined geographic offset. Each datum point in the table stores a value indicative of a particular one of several guidance zones. Each guidance zone has an associated set of characteristics used to provide behavioral guidance to an animal. The determination of the guidance zone is made by determination of the present location using GPS or equivalent signals. Identification of the corresponding table location is made by calculating the latitudinal and longitudinal offsets from a reference point, and using these offsets as the two indices for a double-indexed array. The value retrieved from the double-indexed array identifies the guidance zone. Based upon either or both of collar location history and the desirability value returned from the table, a variety of actions may be triggered within the collar, such as providing appropriate stimuli. The stimuli are transitioned through the multiple zones, ensuring a gradually stepped transition, and may use a variety of neurological access channels.

The present invention and the preferred and alternative embodiments have been developed with a number of objectives in mind. While not all of these objectives are found in or required of every embodiment, these objectives nevertheless provide a sense of the general intent and the many possible benefits that are available from ones of the various embodiments of the present invention.

A first object of the invention is to provide a safe and humane apparatus for modifying the behavior of a pet. From the descriptions provided herein and the teachings incorporated by reference herein above, it will be apparent that the present invention may also be applied in certain instances to humans, livestock or other animals. A second object of the invention is to provide a fully self-contained apparatus that will determine location and provide stimuli based upon that location for extended periods of operation. As a corollary, the fully self-contained apparatus is preferably operational with universally available location systems, including but not limited to satellite GPS, cellular telephone triangulation systems, and radio triangulation system such as Loran, but may alternatively be provided with a custom location system if so desired. By using universally available location systems, there is no limit on the locations where the apparatus may be used. Another object of the present invention is to enable simple and efficient set-up and operation by a person. A further object of the invention is to efficiently and expeditiously train a pet, to significantly reduce training time and increase the effectiveness of the training. As a corollary, embodiments of the present invention will preferably provide the effective animal training while preserving the spirit and positive attitude of the animal. Yet another object of the present invention is to enable a person to set an acceptable area or "safe zone" using only the self-contained apparatus, and to adjust or redefine the area again by simple manipulation of the self-contained apparatus. An additional object of the invention is to enable the self-contained apparatus to automatically generate a number of zones that facilitate positive training and behavior modification, and thereby guide a pet or other living being appropriately. A further object of the invention is to incorporate a variety of stimuli that access the animal's neurological system through different pathways or channels to better gain the attention of the animal.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 5 illustrates the upper left tile or quadrant taken from the map of numerical values of FIG. 4.

DESCRIPTION OF THE PREFERRED EMBODIMENT

Figure 1:
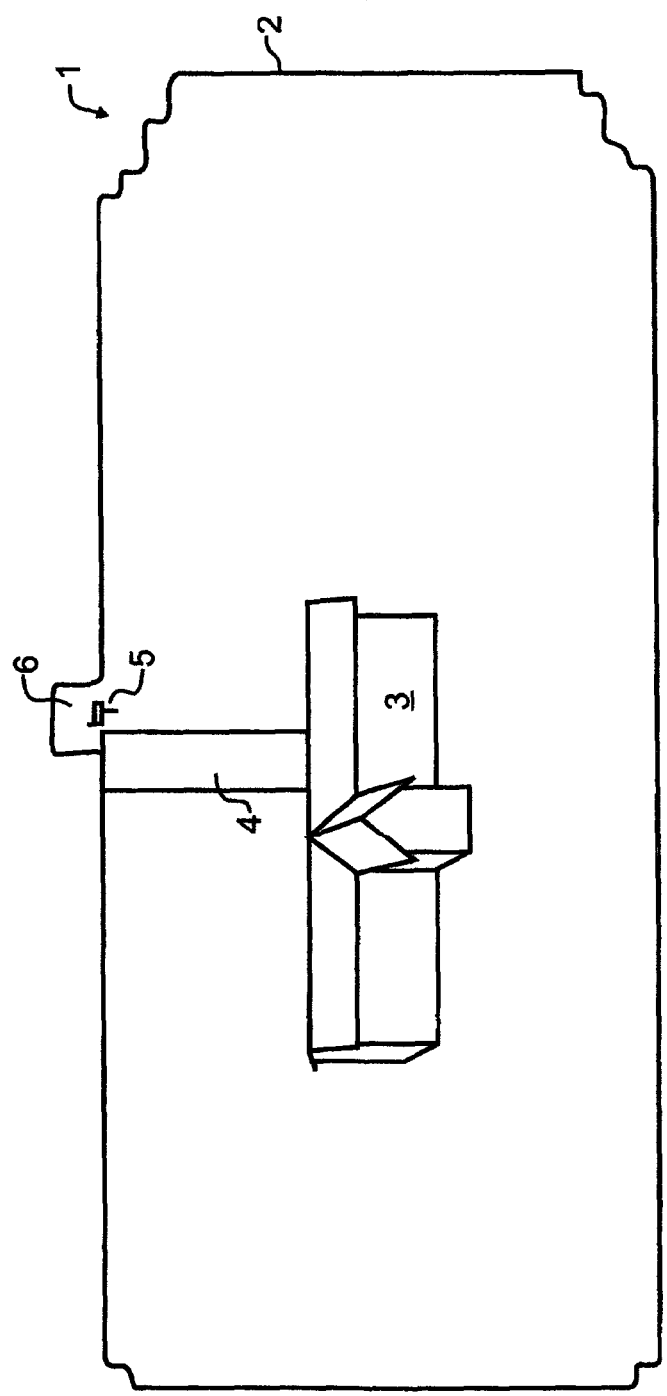
FIG. 1 illustrates a prior art property such as might be mapped in accord with the teachings of the present invention.

In a preferred embodiment designed in accord with the teachings of the present invention, a pet owner might want to train a pet to stay within an example property 1 such as that illustrated in prior art FIG. 1. An outer limit of the property 2 may encompass one or more buildings 3, a driveway 4, and a mailbox 5. If, for exemplary purposes, the pet is or will be trained to walk with the owner to the mailbox, or to retrieve the newspaper from adjacent to the mailbox, then the owner may wish to provide a small peninsula 6 which could extend beyond the bounds of the particular property location.

A self-contained collar apparatus, which might for exemplary purposes and not solely limiting thereto resemble that illustrated by Swanson et al in 2007/0204804 and incorporated by reference herein above, will preferably contain the necessary electronic components such as illustrated in the Swanson et al FIG. 5, including components to receive and decipher location determining signals and also preferably containing both volatile and non-volatile memory. In the preferred embodiment, the location determining signals are converted to latitude and longitude references, though any suitable coordinate reference representative of a geographic area may alternatively be used. Human interaction interfaces, such as switches and a display will also preferably be provided, again such as illustrated in the Swanson et al published patent application, to allow a person to interact with the collar apparatus. Other requisite components, both as described in Swanson et al and as will be understood from the following description, will also be provided therein.

To establish a new area, a person will interact with the self-contained collar apparatus switches or other suitable input apparatus to identify that a new assisted guidance region is to be recorded. Next, the person will transport the self-contained collar apparatus around the perimeter of the land area, such as by following outer limit 2. During this traverse of the outer limit 2, the self-contained collar apparatus will record discrete location points which have been traversed, and add those to a table stored in a memory within the collar. Once the outer limit 2 has been traversed, the person will again interact with the self-contained collar apparatus to identify that the outer limit has been traversed, or, if so enabled, the collar will automatically detect that an area has been completely circumscribed.

Figure 2:
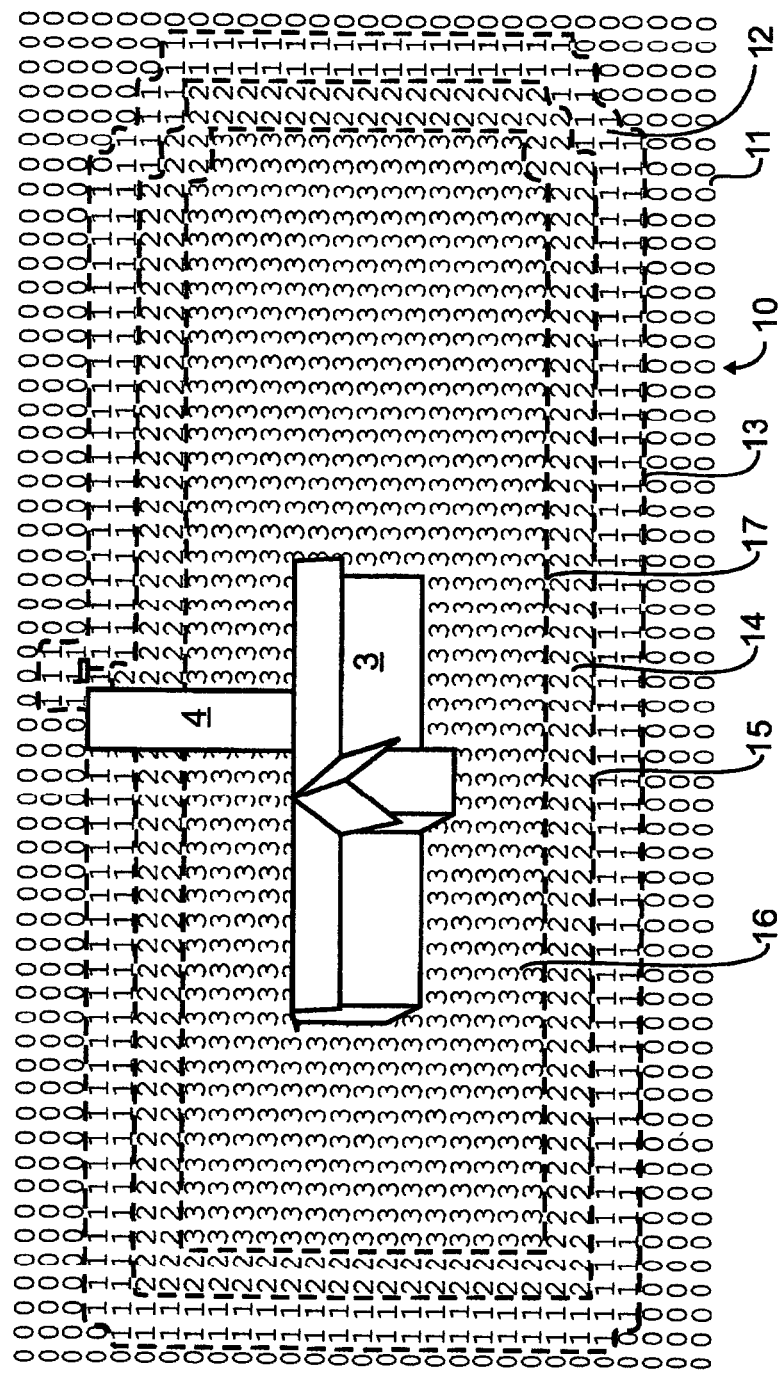
FIG. 2 illustrates a map of numerical values visually overlaid onto and electronically associated with the property of FIG. 1, in accord with the teachings of the present invention.

Next, the micro-controller or other suitable processor will preferably automatically convert this outer limit 2 into a table 10 of values such as illustrated for exemplary purposes in FIG. 2. The embodiments disclosed herein may be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices.

While the numerals 0-3 are used therein for the purposes of the present illustration, any suitable designations, whether numeric or not, may be used. As but one example, the numerals 0-3 represent four choices, and so may easily be represented by two bits of data. In such case, the possible combinations are binary 00, 01, 10, and 11. Furthermore, the present invention is not limited solely to four choices, and any number of choices, including both more and fewer than four, determined by a designer to be appropriate for the apparatus that is otherwise generally compliant with the remainder of the present description will be understood to be incorporated herein.

While FIGS. 1 and 2 illustrate an exemplary outline of an area that the pet owner might wish to contain a dog within, which is a subset of the total property, the area can be of any geometry, and in the example is somewhat irregular.

In the preferred embodiment, a number of different zones are defined based upon the traversal of outer limit 2 during initial setup. The area beyond outer limit 2 is defined by an "out-of-bounds" zone 11 represented by a numerical value of zero at each discrete location. Immediately inside of the zero-value locations is a zone of locations assigned a numerical value of one. This will be referred to herein as the "second alert zone" 12. Between "out-of-bounds" zone 11 and "second alert zone" 12 in FIG. 2, a dashed line 13 has been drawn for illustrative purposes. This line does not actually exist in the stored data table, but instead helps to better illustrate the various zones that are defined by the various location values.

A plurality of discrete locations relatively inward from the second alert zone 12 are assigned a numerical value of two, and represent a "first alert zone" 14. Again, for the purpose of illustration only, a dashed line 15 is shown separating first alert zone 14 from second alert zone 12. Again, and like line 13, this line 15 does not actually exist in the stored data table, and is provided solely for illustrative purposes.

Finally, an innermost "safe zone" 16 preferably intentionally encompasses the largest area of all zones and is populated with discrete location values assigned to equal the numerical value of three. Dashed line 17, like lines 13 and 15, indicates the separate zones, but does not exist in the stored data table.

As is evident when comparing FIGS. 1 and 2, line 13 corresponds approximately to outer limit 2. Due to the discrete nature of the resolution of the particular position determining system, such as a GPS system, the points defined during the traversal of outer limit 2 may or may not exactly correspond to the land location. In addition, since the outer limit 2 may not be linear, and may instead include a number of irregularities such as peninsula 21 and slightly cropped corners 23 and 26 referenced in FIG. 3, the data points more interior but generally adjacent to these irregularities will have variability in their associated geometries relative to that of the outer limit 2. So, and again for exemplary purposes, peninsula 21 is too narrow to provide for the as-illustrated exemplary two data point width provided for each zone. Nevertheless, there is a single data point of numerical value 2 protruding at reference numeral 22 illustrated in FIG. 3. Consequently, as outer limit 2 was traversed at set-up, a dog may reach the base of mail box 5, which is located at this single data point of numerical value 2 at reference numeral 22, without receiving a second alert stimulus. Nevertheless, the dog will still receive a first alert stimulus such as a vibration. Similarly, the intricacies of notched corner 26 are lost as the corner becomes a simple square corner at reference numeral 27 of FIG. 3. Likewise, the elaborate stepping of cropped corner 23 fades some to simpler corner 24, and becomes a very simple single curve at more interior corner 25.

Also strictly for the purpose of illustration, and not limiting the invention solely thereto, two GPS location points are used as the width of each of the first alert and second alert zones. Consequently, in the embodiment as illustrated, each of these first alert and second alert zones are calculated to be approximately two GPS points in width. It will be understood herein that the width of the alert zones may be predetermined to be more or less than the exemplary and illustrated two data points. Furthermore, the number of alert zones may be varied from the two zones that are illustrated.

While the alert zone areas are, in fact, two data points wide, the width of the alert zones at sharp transition points, such as corners, may be greater or less than two data points in width. The particular decisions for how to shape interior zones will be determined by algorithms chosen or written by a designer at design time. Furthermore, there may be times where assisted guidance zones may take on a very irregular shape. This can occur, for exemplary purposes, when there is a narrow peninsula between two larger safe zones. When there is not sufficient room for the predetermined number of alert zone location points, such as within peninsula 21 of FIGS. 1 and 2, in the preferred embodiment the data point calculations still begin with the second alert zone value adjacent to the "out of bounds" area. This presents consistent operation near the borders, and provides more consistent training, which is considered herein to be very important to more quickly training an animal.

As may be apparent, a person may choose where to traverse in order to control the formation of various zones. As an example, a person trying to create a larger buffer adjacent a high traffic road would, when setting up the collar zones, simply walk an outer limit farther from the edge of the road. This maintains more consistent alert zone widths, which is believed to offer better training for an animal than varying the width of the alert zones. Nevertheless, and alternatively, it is contemplated herein to allow a person, the system, or the collar to vary the width of alert zones to correspond with various objects or hazards such as fences, gardens, and roadways.

Figure 3:
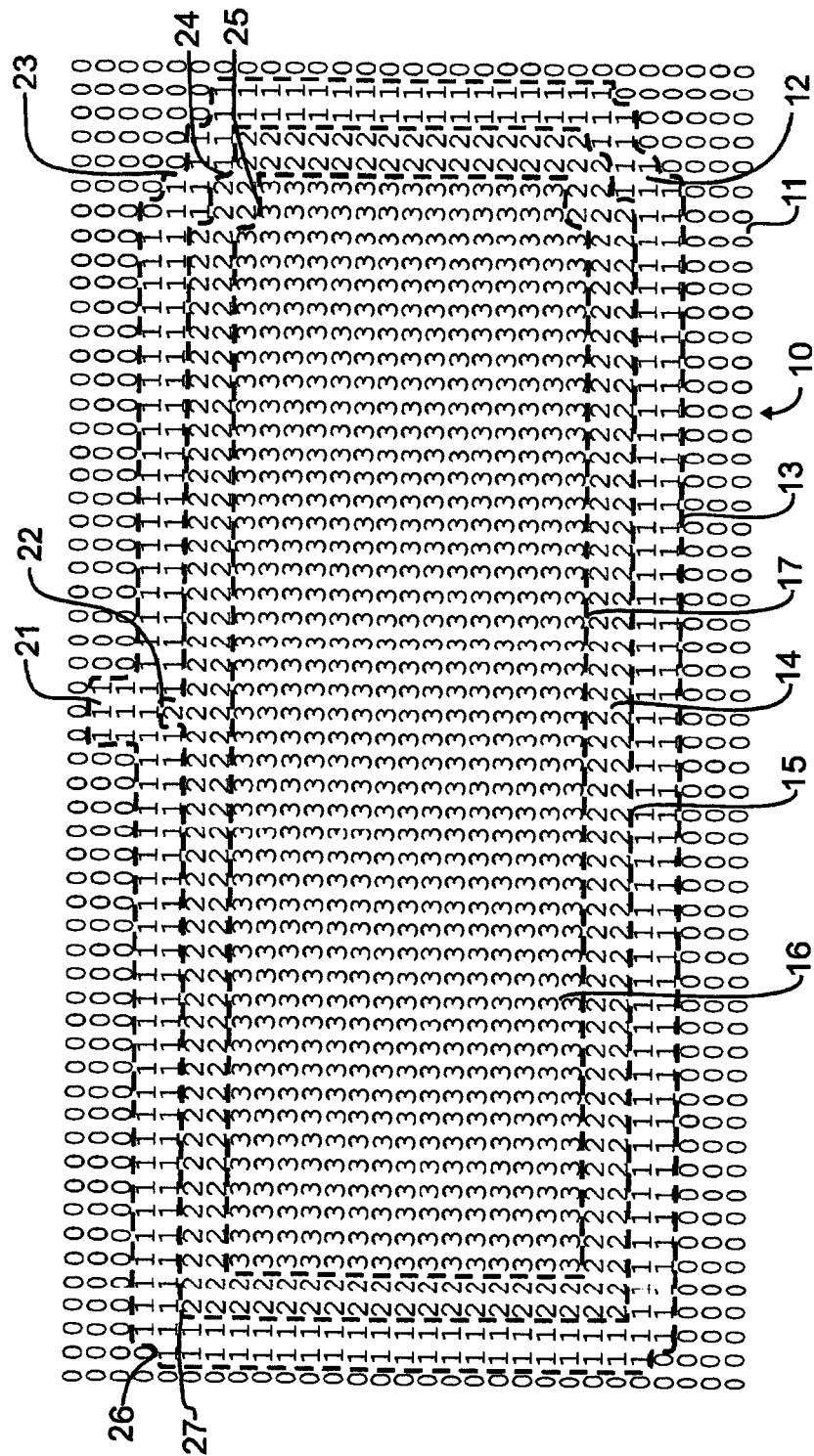
FIG. 3 illustrates the map of numerical values of FIG. 2, but absent the property illustrations.

FIG. 3 illustrates the data table 10 representation of the land area of FIG. 1, but without the land features shown. FIG. 3 simply shows the latitudinal and longitudinal plot of the shape of the assisted guidance zones, as defined by the numerical values stored in data table 10. In accord with the present invention, a latitude and longitude land map is converted to and saved as an X-Y plot or table of points, where one axis (in this case the rows) represents latitude and the other axis (in this case as illustrated, the columns) represents longitude. Each point is then assigned a numerical value that is representative of a zone within the assisted guidance region.

These points may for exemplary purposes and in accord with the preferred embodiment, correspond to specific points of geographic latitude and longitude determined to a particular degree of resolution. The degree of resolution may typically be the limit of precision available for a particular location system, such as six decimals of precision in a GPS system. So, as represented in FIG. 4, the latitude and longitude representations are presented to six decimal precision, though other suitable levels of precision are considered incorporated herein.

Noteworthy herein is the fact that the data points do not correspond to an exact measure in feet or inches. Instead, and as known in the industry of mapping, a single second of longitude at the equator is the equivalent of approximately 101 feet. In contrast, a single second of longitude at sixty degrees north latitude, which is approximately the location of Oslo, Norway; Helsinki, Finland; and Anchorage, Ak.; is only approximately 51 feet. Taken to the extreme, at the north and south poles, a second of longitude is zero feet. For prior art systems attempting to calculate distances in feet or inches, this deviation of longitudinal distance as the collar moves away from the equator drastically increases the complexity of calculations required. In contrast, the present invention directly associates GPS data points with zones, and disregards the distance in feet or inches that this may be equivalent to.

Figure 4:
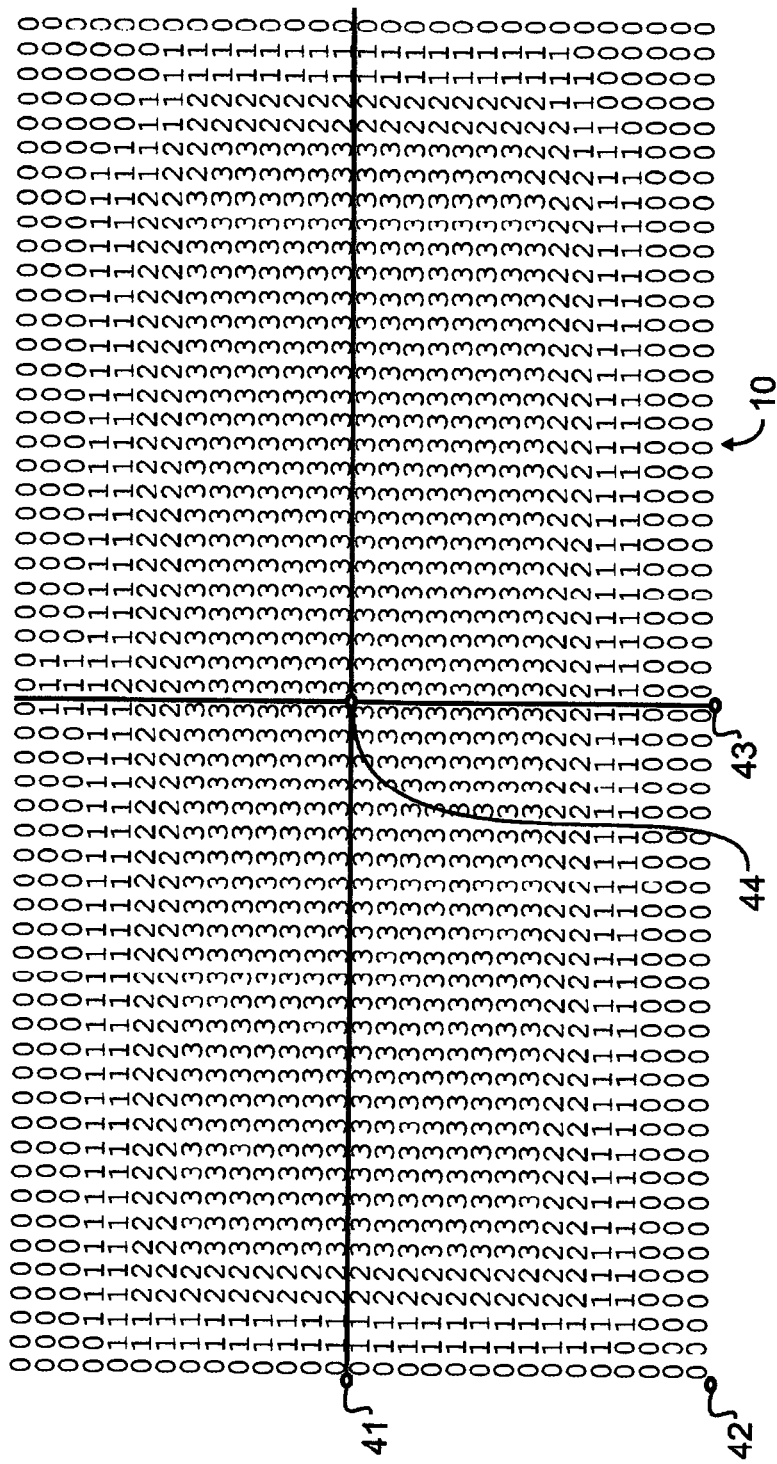
FIG. 4 illustrates the map of numerical values of FIG. 3, divided into four distinct tiles and including a latitude and longitude reference point associated with each tile.

In the illustration of FIG. 4, reference point 41 may for example represent a point at 44.925866 degrees latitude, and −92.940617 longitude. Reference point 42 may represent a point at 44.925673 degrees latitude, and −92.940617 longitude. Reference point 43 may be used to represent a point at 44.925673 degrees latitude, and −92.940160 longitude. Reference point 44 may be used to represent a point at 44.925866 degrees latitude, and −92.940160 longitude. While as illustrated these reference points 41-44 are shown slightly offset from and intermediate between the various data points, they may instead be selected to correspond exactly to a particular data point in table 10.

As may be appreciated, for a given amount of latitude and longitude resolution, the larger a tile is, the more memory is required to store the tile. In other words, if the GPS data point resolution were representative of five foot increments across the surface of the earth, it would only take twenty of these increments to cover a one hundred foot property boundary. For a square property of 100 feet by 100 feet, there would only be a total of 400 data points within the outer boundary. Even with the inclusion of data points outside of the boundary, this property could easily be mapped with a thousand data point tile.

In contrast, using this same five foot resolution, a large property such as a large ranch, farm, park, or the like would require more than one million points to map. As may be appreciated, this requires one thousand times the tile size to save the entire assisted guidance region within a single tile in memory, or one thousand times the available memory.

Storage of data table 10 requires memory, and a suitable electronic system within the collar will not be provided with unlimited memory within which to store data points. The particular type of memory selected is well within the level of skill of a designer of portable devices using microprocessors, micro-controllers and the like, and the invention is not limited to a single or particular type of memory. In accord with a preferred embodiment of the system, the memory will be divided into some combination of slower non-volatile memory and relatively faster but volatile RAM. The slower, non-volatile memory for exemplary but non-limiting purposes might comprise well-known flash memory. If the device uses higher speed memory such as RAM to reduce operation time, and there are more data points than available space in RAM to store table 10, the preferred embodiment processor will analyze the table and set up one or more tiles in RAM to be used during system operation.

To cover the exemplary property of FIG. 1, the numerical representation of FIG. 4 incorporates a total of four distinct "tiles" or squares that contain these numerical representations. FIG. 5 provides a zoomed-in view of only one of these four tiles, the top left tile of FIG. 4. Using this preferred numerical representation substantially reduces the calculations required when compared to the prior art.

In an exemplary operation, the latitude-longitude location of a dog is determined through the GPS system as is known in the field of navigation. This is then used to determine which tile, plurality of tiles, or single numerical representation is required to determine the position of the dog. If the tile containing the particular latitude and longitude is not already loaded into RAM, then it will be loaded. This determination will be easily made by comparing the current latitude and longitude to the reference points such as points 41-44 to select the appropriate tile(s). Then, preferably and for exemplary purposes, a simple RAM access may be made, where the RAM memory location is calculated based upon the present latitude and longitude offset from the lower-left latitude and longitude found on the numerical representation tile. This lower-left corner may be understood to be the reference location for the tile, such as reference point 41 in the illustration of FIG. 5. While any point within a tile may be used as a reference location, the lower-left is illustrated for exemplary purposes.

Figure 5:
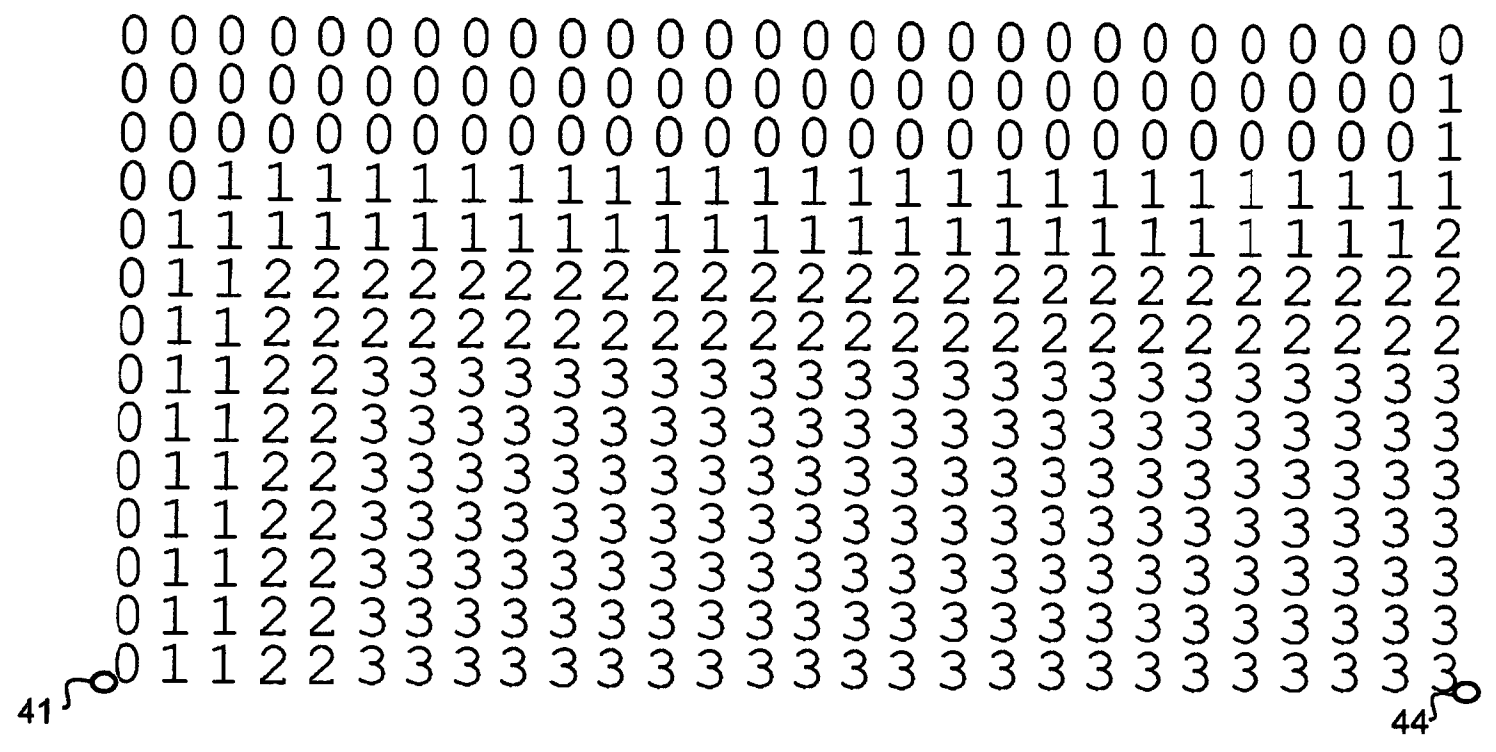

The offset determination is a simple subtraction of the reference location, such as reference point 41 of FIG. 5, from the currently determined location. Then, this difference is used as the table index, to directly address the particular table location. In the preferred embodiment, each data point is stored in memory using a double-indexed array, with each of the two indices of the array uniquely representing one of the latitudinal or longitudinal offset from the reference point. For exemplary purposes, this may be written as ArrayName [latitude-offset][longitude-offset]. Each unique [latitude-offset] [longitude-offset] may for exemplary purposes point to a unique location in memory where the zone value associated with that geographic location is stored.

In an alternative embodiment, the offset may be additionally converted in a proportional or scalar calculation, where a particular number of degrees of latitude, for example, are known to equal one data point shift to the right in table 10. This requires storing the scalar conversion and an extra scalar calculation to look up the data value for a location, both which may be undesirable for some applications.

Once the offset is calculated, then the memory location is queried and the contents of the memory are returned in the form of a numerical value from 0-3, the meaning which represents whether the dog is comfortably within the safe zone ("3" in the preferred embodiment), or is in the first alert ("2" in the preferred embodiment), second alert ("1" in the preferred embodiment), or out-of-bounds zones. After GPS location is determined, the only calculation required during operation of the dog collar to determine whether the collar is within an assisted guidance zone is the calculation of offset in latitude and longitude from the reference point in the lower left corner of the tile. This is a very rapid and easy calculation, followed by a near-instantaneous read of the memory contents. In the preferred embodiment then, all numerical representation calculations are performed at the time the outer limit is defined, and then these numerical representation tiles are saved, preferably in non-volatile memory such as within EEPROM, flash memory, or equivalent storage. Saving in non-volatile memory allows the stored map to be used at a later date, even if the battery should fail in the interim.

The procedure used to clear a map from memory is also quite simple in the preferred embodiment. Once the user selects the map to delete, the associated tiles in memory are simply rewritten to numerical values of zero; or simply deleted from a directory of memory or a file allocation table; or otherwise deleted as known in the field of computing.

When the collar is in use for pet containment, the numerical representation tiles may be swapped into and out of active memory as required. This means that storage of diverse locations does not require storage of every location in between. So, for example, storage of two distinct one acre maps on opposite sides of the earth does not require storing millions of acres of maps. Instead, only those tiles associated with a latitude and longitude actually used by a map are required to be stored in memory. Again, while the use of tiles is not essential to the operation of the present invention, the ability to create these tiles means that with only very modest amounts of memory and processing capability, the present invention may be used to map one or a plurality of assisted guidance regions literally anywhere on earth.

Figure 6:
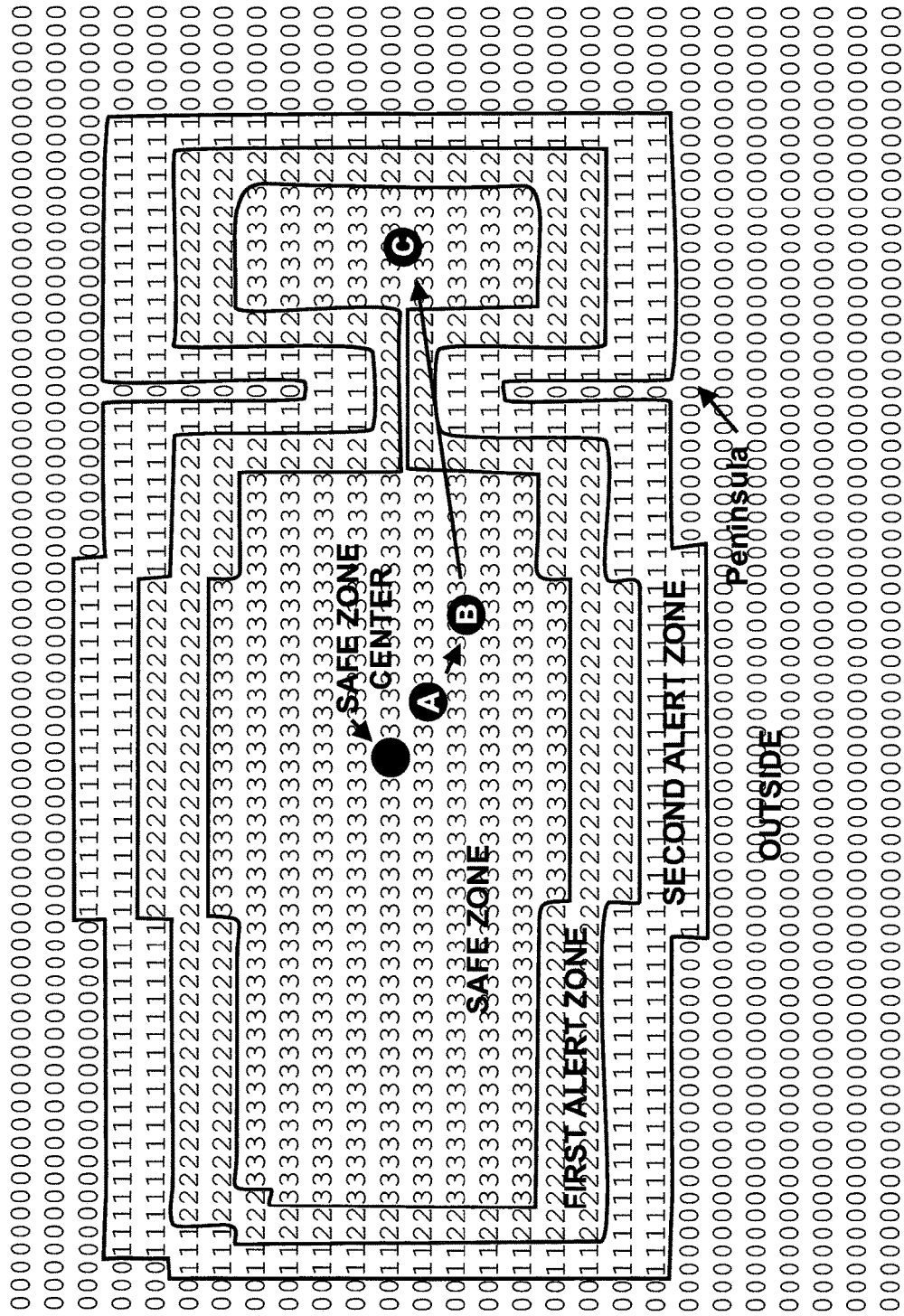
FIG. 6 illustrates a preferred embodiment method for establishing and operating a multi-zone containment area, the method designed in accord with the teachings of the present invention

There may be times where the assisted guidance region takes on a very irregular shape, forming a narrow peninsula between two larger safe zones. This is illustrated in exemplary FIG. 6. When there is not sufficient room for the predetermined and constant zone width, such as within the peninsula of FIG. 6, the data point calculations begin with the second alert zone. If possible, there will be the predetermined data point width calculated for each zone. In the illustration of FIG. 6, this was possible for the second alert zone. Next, the data points are calculated for the first alert zone. In the example of FIG. 6, there is not sufficient space between the upper and lower narrowed regions of the peninsula to create two zones of two data point width. As a result, the remaining available space through the peninsula is created as a first alert zone. Note that this means there is no safe zone space in the narrowed portion of the peninsula. In turn, this means that a dog may move from point A to point B without any hindrances. However, moving from safe zone point B to safe zone point C cannot be accomplished without passing through the first alert zone. As may be appreciated, the formation of particularly narrow peninsulas may, in fact, result in the cutting off of areas that would otherwise be available for the pet, or at least a requirement that the pet traverse an alert zone. Such is the case for FIG. 6, where a pet must traverse the first alert zone to move from point B to point C, and will not be able to pass to point C in the safe zone. In the preferred embodiment, the width of the outermost zones are maintained, rather than proportionally reducing the width of all of the zones. If there is not enough total width between opposed perimeter points in a region of the containment area to provide all zones at the predetermined data point width, the inner zones are slighted or removed entirely. In the peninsula region of FIG. 6, the safe zone is removed entirely, and the alert zone is reduced in the narrow peninsula. This is desired because the pet will most preferably know and recognize the approximate width of each zone where the pet receives feedback reasonably accurately. Otherwise, for a less desirable proportionate width zone arrangement where each zone remains equal to the other zones in width, to the pet the training regimen might appear to be unpredictable and random.

A number of other features may also desirably or optionally be incorporated into a preferred embodiment pet assisted guidance system. Using the teachings of the present invention, the collar may be designed to contain an entire and independent pet assisted guidance system. In other words, no additional components would need to be purchased or acquired, nor is there a need for any other external device other than the GPS satellites. The collar will preferably interact directly with GPS signals received from GPS satellites, and may for enablement use a commercially available set of components to determine latitude and longitude.

Desirably, the accuracy of the GPS determinations may be significantly improved by incorporating a loosely coupled inertial navigation system into the collar. The inertial navigation system may then be used to validate GPS readings, and may also be used to discard outlier position info such as might be produced sporadically. For exemplary purposes, when an inertial system indicates no movement of the dog and a GPS or equivalent determination indicates a sudden multi-meter jump, then the data point indicative of a sudden multi-meter jump can be discarded or ignored. Likewise, tracking movement of the collar in combination with a compass within the collar may be used to determine what direction of travel is in a forward direction. Dogs do not run backwards. Consequently, if the GPS determination indicates a sudden reversal of direction without an associated reversal of direction by the compass, then this may also be discarded or ignored.

An inertial system or biometric system may also optionally be used to pre-alert dog state and predict sudden location changes. This can be used to be more pre-emptive at alerting the dog of impending boundaries. Exemplary biometric indicators might be heart or respiration rates, and an exemplary inertial indicator might be a sudden head lifting or movement.

Inertial, biometric and location-based indicators may further be used to control the frequency of GPS position calculation, which in turn is related to the average power consumption and battery life. So, for exemplary purposes, if the collar is in a dwelling, the GPS may be deactivated. Similarly, if inertial and/or biometric indicators suggest that the dog is sleeping, the sampling rate may be substantially less frequent, if at all, until the dog wakes up. Additionally, when the dog is within the safe zone, the sampling rate may also be less frequent.

When desired, a remote control interface or external device may also be provided, but such device is not mandatory. Where such an interface is provided, assisted guidance regions may also be communicated from an external computing device such as a cellular telephone or various other mobile or fixed computing devices. In such case, the collar unit will preferably be provided with a local wireless interface. The local wireless interface may be of any suitable type, including but not limited to Bluetooth™, cellular, or other type of radio or alternative communications link.

These assisted guidance regions may at least in some cases be calculated without requiring a person to first walk the perimeter. While not solely limited thereto, this can be particularly helpful at popular places such as at dog parks or other public places that might be frequented by many pet owners. In such case, a map already created for the park may be provided and may, for exemplary purposes, be downloaded from an Internet location through a smart phone, computer or other computing device. The map may be directly forwarded to the collar, or may be edited within the computing device and then forwarded. Additionally, with such an interface a user might draw an assisted guidance area perimeter or even various zones upon an electronically stored map and transmit them to the collar.

As aforementioned, there will preferably be multiple zones in the assisted guidance region such as the "safe", "first alert", and "second alert" zones to train and shape the behavior of an animal such as a pet, so that appropriate behavior may be rewarded, thereby improving training effectiveness and success. A very preferred aspect of the present invention is the careful rewarding of good behavior, and guiding the animal to the safe zone. This is most preferably accomplished in an entirely non-aversive manner. For exemplary purposes, a comforting stimulus may be provided at particular time intervals to assure or reassure a dog within the safe zone 16. Furthermore, such stimulus may be timed in accord with activity of the dog, such as when the dog is moving about and remaining within safe zone 16. For exemplary purposes and not solely limiting thereto, a comforting tone or recorded sound such as the owner's voice saying "good dog" may be periodically generated.

In one embodiment contemplated herein, the velocity of the dog, including direction and speed, will also be calculated, by using the difference of the current and previous positions over time. In the event there is a danger of the dog moving outside of the safe zone, the first alert zone 14 stimulus may be applied, until the dog is confirmed to be remaining in safe zone 16, whereby the comforting stimulus may be applied.

The first alert zone 14 assigned with a numeric value of "2" may be used to generate a vibration which is preferably very distinct from the comforting tone or "good dog" recording of safe zone 16. This vibration will preferably gently alert the dog of the transition out of safe zone 16 and to the need to return thereto. Furthermore, this first alert zone vibration may be varied in both intensity and frequency when desired, for exemplary and non-limiting purposes such as to be further representative of such factors as proximity to adjacent zones, direction of travel, and speed of travel. The purpose of the first alert stimulation is not to invoke pain in any way, or to provide any punishment. Consequently, a gentle vibration or distinct tone is preferred. The purpose is simply to catch the attention of the dog and communicate to the dog that the dog has left the safe zone, so that the dog can elect to move back into the safe zone. This first alert is provided in real time, so that the dog will understand the purpose of the alert.

An important feature of the present invention is the detection of at least one indicator of the direction of travel of the dog, and whether that direction of travel is indicative of progress toward returning to the safe zone. For exemplary purposes only, and not solely limiting the present invention thereto, these indicators might include one or more of the following: sequential GPS position determinations indicating a shift of position toward the safe zone; a compass indication of a directional shift toward the safe zone; an inertial sensor detecting a direction change toward the safe zone; or other suitable indication of direction. In an alternative embodiment, the indicators might also include intent of direction by the animal. When the dog is outside of the safe zone and the indicator of direction of travel indicates movement toward the safe zone, the safe zone stimulus will most preferably be provided. In the preferred embodiment, this may be a short sounding of the safe zone tone, for exemplary and non-limiting purpose, to reward the animal for moving toward the safe zone. Once back in the safe zone, the dog will again receive positive reinforcement from the safe zone stimulation as described above.

The second alert zone 12 assigned with a numeric value of "1" may be used to trigger a low level electrical impulse stimulation or other stimulation different from that of the safe zone and first alert zone stimulation. Once again, this stimulation will very preferably not generate pain, but instead will provide a distinct stimulation. Tactile stimulation is used in the preferred embodiment, with the desire to incorporate communications through a sensory pathway different from the auditory stimulation of the safe zone.

Noteworthy herein is that electrical impulse stimulation is well known in the medical, veterinary, and biological sciences, and can be varied for a particular intent. A weak stimulation may be unnoticeable. As the strength of stimulation is increased, there may be a gentle tingle. An even stronger stimulation can cause mild muscle contraction, and with enough strength, there can be a painful stimulation. For exemplary purpose, Transcutaneous Electrical Nerve Stimulation (TENS) is used in the treatment of humans explicitly as a technique to alleviate pain, rather than to cause pain, and electric current is likewise used in wound healing and tissue repair. Consequently, for the purposes of the present invention, this second alert zone stimulation will be understood to be detectable by the animal, while remaining below the threshold of pain.

The purpose of this second alert zone stimulation is, just as with the first alert zone stimulation, to gain attention of the dog, communicate the impending boundary, and to give the dog the opportunity to return to the safe zone. By making the stimulation different from the first alert zone, this second alert zone stimulation will also clearly provide proper notice to the dog of the impending boundary. This notice is provided in real time, so that the dog will understand the purpose of the notice.

Most preferably, if electrical impulse stimulation is used in the second alert zone, the stimulation will be provided using technology such as illustrated in U.S. Pat. No. 7,677,204 incorporated by reference herein above, which is considered to be a most humane method of application. Nevertheless, and while much less preferable, other known techniques for electrical impulse stimulation will be considered herein as alternative embodiments. Furthermore, this second alert zone electrical impulse stimulation may be varied in both intensity and frequency when desired, for exemplary and non-limiting purposes such as to be further representative of such factors as proximity to adjacent zones, direction of travel, and speed of travel. As with the first alert zone, in the second alert zone when an indicator of direction of travel indicates movement toward the safe zone, the safe zone stimulus will be provided.

Finally, a numeric value of "0" designates a point outside of the second alert zone. In this case, the dog may be stimulated with a stronger electrical impulse stimulation. However, this stimulation will most preferably not continue indefinitely, which will be recognized to be quite aversive. In the foregoing description, time is described as one factor for calculating when to discontinue electrical impulse stimulation. Preferably, in addition to time, the direction of travel of the dog will also be considered. As soon as the dog starts moving toward the safe zone, electrical impulse stimulation will be discontinued irrespective of time outside of the safe zone. Instead, in the preferred embodiment positive feedback such as a safe zone or similar stimulus is provided when the dog is moving in a direction back toward the safe zone. If instead the collar unit detects movement away from the safe zone, the collar unit will deliver a second alert zone stimulus to the dog. In the preferred embodiment, this second alert zone stimulus is a medium electrical impulse stimulation selected to provide tactile stimulation that does not invoke pain. If the collar unit detects movement that isn't getting closer or further away, it delivers the "first alert" vibration to the dog. In this manner, the dog is continually and immediately rewarded for movement toward the safe zone, is reminded through auditory stimulation for indeterminate movement, and receives tactile stimulation for movement away. The dog will thereby be directed back into the safe zone. As the dog is crossing back into the second alert zone from the "out of bounds" zone, the collar unit will preferably combine the comforting tone of the safe zone with a medium level vibration until the dog is in the safe zone. At that time, the collar unit will revert from this wayward dog shepherding mode back to the initial containment mode. This allows appropriate pet behavior to be rewarded, thereby improving training effectiveness and success.

The use of auditory stimulation in the safe zone, vibratory stimulation in the first alert zone, and transcutaneous electrical nerve stimulation in the second alert zone is most preferred, since each stimulation communicates with a dog through a different neurological access channel. If for one reason or another a dog is non-responsive to a particular neurological access channel, then the sequencing of access channels will be much more likely to gain the dog's attention, even when attention is otherwise difficult to garner. With the use of this preferred sequencing, the stimulation is most preferably selected and designed to be entirely non-aversive. Other known forms of stimulation that are operative through a unique neurological access channel when compared to other stimulation used in an embodiment of the invention, and most preferably which are non-aversive, will be understood to be incorporated herein as well. One non-limiting example is the use of light, such as a bright light or flash, to garner the animal's attention.

In an alternative embodiment, adjacent zones may alternate between different neurological channels, and so for exemplary and non-limiting purposes only, the safe zone and second alert zones may incorporate an auditory stimulation, while the first alert zone and out-of-bounds zones might incorporate a vibratory stimulation. While not communicating through as many neurological pathways as the preferred embodiment, this alternating approach offers advantage over the use of a single neurological channel. Likewise, when a larger number of zones are used, a designer may elect not to attempt to provide a unique neurological channel for every zone, and may instead still preferably use different neurological channels for adjacent zones.

Noteworthy herein is the understanding that while these diverse neurological channels help to better communicate with an excited dog, this does not mean that a non-aversive system will have only gentle stimuli. It will be appreciated herein that an excited animal will not sense stimuli as well as a calm animal. In an excited state, many animals have much greater pain thresholds and many will also mute senses that are not a part of the cause of the excited state. In other words, a dog who has smelled a rabbit may not hear or feel ordinary sensations, and will only feel a gentle sensation during the excited state that might, in a calm state, be perceived as aversive. Consequently, the strength or level of the various stimuli may also be designed to factor in the level or expected level of excitation of the animal at the time of stimulation. This may include biometric or inertial sensing as well, such that a dog in the heat of a chase may receive a stronger stimulus than a dog slowly ambling about.

While the present invention illustrates three zones within an assisted guidance region, the safe zone, first alert zone, and second alert zone, the present invention is not solely limited to a particular number of zones within an assisted guidance region, or a particular way to represent those zones. The numerical representations from zero to three are preferred, but any other representations that may be machine stored are contemplated herein. However, the present invention automatically converts a walked perimeter into the zones, and avoids altogether the construction of a fence or border such as shown in the prior art, and the disadvantages associated therewith.

This zonal configuration is very consequential when compared to those prior art containment systems that include calculations of borders and distance from a border. In particular, and as evident from the present figures, the distance from the "out-of bounds" zone will vary depending upon the alignment of the particular GPS data points used to define the present assisted guidance region. This distance is irrelevant to the present invention, and instead the stimuli are determined based upon the presence within a particular zone. For exemplary purposes, this means that if each data point is representative of five feet on the ground, then a two data point width first alert zone of the present invention would provide the animal the same stimulus through the entire ten foot zone. In turn, this enables the substantially reduced processing of the present invention compared to that of the prior art.

Furthermore, the area outside of the assisted guidance region, assigned a value of zero, is still referred to herein as the "out-of-bounds" zone. This is because, in the present invention, the process of providing encouragement and direction to an animal continues outside of the assisted guidance zone, and in fact can occur anywhere at all. In other words, at the time of design, a designer must decide whether to enable the possibility of all land area on earth to be incorporated into the out-of-bounds area, or whether a limit will be set on how far a reasonable distance is beyond which the assisted guidance zone will be entirely ignored.

While the preferred embodiment table 10 has been described herein above and illustrated in FIGS. 2-4 for the purposes of enablement as cooperative with a self-contained collar apparatus such as that illustrated by Swanson et al in 2007/0204804, it should be apparent that the table 10 incorporating discrete values representative of various zones may be used with other apparatus such as found in many other patents incorporated herein by reference above and other systems, as will be understood and appreciated by those skilled in the art.

While the foregoing details what are felt to be the preferred and additional alternative embodiments of the invention, no material limitations to the scope of the claimed invention are intended. The variants that would be possible from a reading of the present disclosure are too many in number for individual listings herein, though they are understood to be included in the present invention. For exemplary purposes only, and not solely limiting the invention thereto, the words "dog" and "animal" have been used interchangeably herein above. This is in recognition that the present invention has been designed specifically for use with dogs, but with the understanding that other animals may also be trained using apparatus in accord with the teachings of the present invention. Consequently, the present invention is understood to be applicable to other animals, and the differences that will be required of an alternative embodiment designed for animals other than dogs will be recognized based upon principles that are known in the art of animal training. Further, features and design alternatives that would be obvious to one of ordinary skill in the art are considered to be incorporated herein. The scope of the invention is set forth and particularly described in the claims herein below.

We claim:

1. A method of defining individual zones within a multi-zone assisted guidance region having at least a perimeter, a safe zone interior of said perimeter, a second zone adjacent to said perimeter, and a first zone adjacent to said safe zone, comprising the steps of:

electronically storing a zone GPS data point target width;

electronically calculating GPS data points located within said perimeter;

electronically assigning to said second zone a first subset of said GPS data points that are located within said perimeter and that are also within a number of GPS data points of said perimeter approximately equal to said zone GPS data point target width;

electronically allotting to said first zone a second subset of said GPS data points located within said perimeter that are unassigned subsequent to said electronic assigning step and that are also located interior of and distinct from said second zone and within a number of GPS data points of said second zone approximately equal to said zone GPS data point target width;

electronically ascribing unassigned and unallotted GPS data points located interior of and distinct from said first zone to said safe zone;

whereby for each of said first and second zones calculated if there is not enough total width between perimeter points in a region of said assisted guidance region to provide said first and second zones at said zone GPS data point target width, a data point width of said second zone is electronically maintained at said zone GPS data point target width and a data point width of at least one zone interior to said second zone is reduced.

2. The method of defining individual zones within a multi-zone assisted guidance region of claim 1, further comprising a step of electronically associating with each of said safe zone, second zone and said first zone a unique set of characteristics to provide behavioral guidance stimulation.

3. The method of defining individual zones within a multi-zone assisted guidance region of claim 2, further comprising a step of providing stimulation to an animal through an animal stimulation apparatus responsive to a location of said animal within at least one of said safe zone, first zone, and second zone.

4. The method of defining individual zones within a multi-zone assisted guidance region of claim 1, further comprising a step of electronically associating at least two adjacent ones of said individual zones each with a unique animal stimulation, a first one of said at least two adjacent ones of said individual zone unique animal stimulations acting through a different neurological access channel than a second one of said at least two adjacent ones of said individual zone unique animal stimulations.

5. The method of defining individual zones within a multi-zone assisted guidance region of claim 4, wherein said associated unique animal stimulation is selected from a group of auditory stimulation, vibratory stimulation, and transcutaneous electrical nerve stimulation.

6. The method of defining individual zones within a multi-zone assisted guidance region of claim 5, wherein said auditory stimulation is electrically associated with said safe zone.

7. The method of defining individual zones within a multi-zone assisted guidance region of claim 5, wherein said vibratory stimulation is electrically associated with said first zone.

8. The method of defining individual zones within a multi-zone assisted guidance region of claim 5, wherein said transcutaneous electrical nerve stimulation is electrically associated with said second zone.

9. The method of defining individual zones within a multi-zone assisted guidance region of claim 5, wherein an electrical impulse stimulation is electrically associated with said perimeter.

10. The method of defining individual zones within a multi-zone assisted guidance region of claim 4, wherein said unique animal stimulations comprise non-aversive stimulation.

11. The method of defining individual zones within a multi-zone assisted guidance region of claim 1, further comprising a step of associating each one of said individual zones with a unique animal stimulation that acts through a different neurological access channel than any other ones of said unique animal stimulations of said individual zones.

* * * * *